US009262357B2

(12) United States Patent
Accapadi et al.

(10) Patent No.: US 9,262,357 B2
(45) Date of Patent: Feb. 16, 2016

(54) ASSOCIATING PROCESS PRIORITY WITH I/O QUEUING

(75) Inventors: Jos M. Accapadi, Austin, TX (US);
Andrew Dunshea, Austin, TX (US);
Vandana Mallempati, Austin, TX (US);
Agustin Mena, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1003 days.

(21) Appl. No.: 12/240,190

(22) Filed: Sep. 29, 2008

(65) Prior Publication Data
US 2010/0082855 A1    Apr. 1, 2010

(51) Int. Cl.
G06F 3/00     (2006.01)
G06F 13/364   (2006.01)

(52) U.S. Cl.
CPC .................... *G06F 13/364* (2013.01)

(58) Field of Classification Search
USPC ........................................................... 710/39
See application file for complete search history.

(56) References Cited

U.S. PATENT DOCUMENTS

| | | | |
|---|---|---|---|
| 4,630,261 A | 12/1986 | Irvin | |
| 5,115,392 A | 5/1992 | Takamoto et al. | |
| 5,327,526 A * | 7/1994 | Nomura et al. | 358/1.16 |
| 5,327,558 A | 7/1994 | Burke et al. | |
| 5,517,324 A | 5/1996 | Fite, Jr. et al. | |
| 5,588,009 A | 12/1996 | Will | |
| 5,600,312 A | 2/1997 | Willard | |
| 5,767,849 A | 6/1998 | Borgendale et al. | |
| 5,991,824 A | 11/1999 | Strand et al. | |
| 6,021,333 A | 2/2000 | Anderson et al. | |
| 6,055,564 A * | 4/2000 | Phaal | 709/207 |
| 6,147,977 A | 11/2000 | Thro et al. | |
| 6,157,401 A | 12/2000 | Wiryaman | |
| 6,164,920 A | 12/2000 | Nazarian et al. | |
| 6,222,841 B1 | 4/2001 | Taniguchi | |
| 6,570,876 B1 | 5/2003 | Aimoto | |
| 6,658,485 B1 | 12/2003 | Baber et al. | |
| 6,816,494 B1 | 11/2004 | Raza | |
| 6,880,028 B2 * | 4/2005 | Kurth | 710/240 |
| 6,965,577 B1 | 11/2005 | Murphy | |
| 7,010,611 B1 | 3/2006 | Wiryaman et al. | |

(Continued)

OTHER PUBLICATIONS

"U.S. Appl. No. 11/274,772 Final Office Action", Dec. 9, 2009, 18 pages.

(Continued)

*Primary Examiner* — Henry Tsai
*Assistant Examiner* — Juanito Borromeo
(74) *Attorney, Agent, or Firm* — DeLizio Law, PLLC (57) ABSTRACT

Input/output (I/O) requests generated by processes are typically stored in I/O queues. Because the queued I/O requests may not be associated with the processes that generated them, changing a process' priority may not affect the priority of the I/O requests generated by the process. Therefore, after the process' priority has been increased, it may be forced to wait for an I/O handler to service its I/O request, which may be stuck behind an I/O request generated by a lower priority process. Functionality can be implemented to associate the processes' priorities with the I/O requests generated by the processes. Also, reordering the queued I/O requests to reflect changes in the processes' priorities can ensure that the I/O requests from high priority processes are serviced before the I/O requests from low priority processes. This can ensure efficient processing and lower wait times for high priority processes.

2 Claims, 6 Drawing Sheets

(56) References Cited

U.S. PATENT DOCUMENTS

| | | |
|---|---|---|
| 7,215,652 B1 | 5/2007 | Foley et al. |
| 7,290,266 B2 | 10/2007 | Gladstone et al. |
| 7,447,777 B1 | 11/2008 | Singh Ahuja et al. |
| 7,577,145 B2 | 8/2009 | Maruyama et al. |
| 7,710,871 B2 | 5/2010 | Lavian et al. |
| 7,721,294 B2 | 5/2010 | Quinet et al. |
| 2002/0136228 A1 | 9/2002 | Miyamoto |
| 2002/0141449 A1 | 10/2002 | Johnson |
| 2003/0091042 A1 | 5/2003 | Lor |
| 2003/0097436 A1 | 5/2003 | Clow et al. |
| 2003/0214949 A1 | 11/2003 | Shaikli et al. |
| 2004/0032869 A1 | 2/2004 | Ambe et al. |
| 2004/0179523 A1 | 9/2004 | Maruyama et al. |
| 2005/0022207 A1 | 1/2005 | Grabarnik et al. |
| 2005/0050353 A1 | 3/2005 | Thiele et al. |
| 2005/0060295 A1 | 3/2005 | Gould et al. |
| 2005/0163138 A1 | 7/2005 | Kanazawa |
| 2005/0198110 A1 | 9/2005 | Garms et al. |
| 2005/0228863 A1 | 10/2005 | Palmeri et al. |
| 2006/0007935 A1 | 1/2006 | Bennett et al. |
| 2006/0109857 A1 | 5/2006 | Herrmann |
| 2007/0276958 A1 | 11/2007 | Curtis et al. |
| 2009/0077205 A1 | 3/2009 | Quinet et al. |

OTHER PUBLICATIONS

"U.S. Appl. No. 11/274,772 Office Action", Jun. 11, 2010, 11 pages.
"U.S. Appl. No. 11/274,772 Office Action", May 1, 2009, 13 pages.
"U.S. Appl. No. 11/274,772 Office Action", Aug. 7, 2008, 13 pages.
"U.S. Appl. No. 11/274,772 Final Office Action", Dec. 23, 2010, 11 pages.

* cited by examiner

ASSOCIATING PROCESS PRIORITY WITH I/O QUEUING

BACKGROUND

Embodiments of the inventive subject matter generally relate to the field of computer architecture, and more particularly, to techniques for associating process priority with I/O queuing.

An application's processes can generate input-output (I/O) requests for read-write operations. I/O requests are generally stored in I/O queues, where they wait to be processed. Once the I/O requests are stored in the I/O queues, the I/O requests are no longer associated with the processes from which they originated. Thus, changing a process' priority may not affect the priority of the I/O request it generated.

SUMMARY

Embodiments include a method directed to detecting one or more incoming input-output (I/O) requests. The I/O requests are stored in an I/O queue. Information associated with the one or more processes from which the I/O requests originated is determined. The determined information comprises one or more priorities of the one or more processes. The I/O requests in the I/O queue are sorted, based at least in part on, the process priorities.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. In some instances, well-known instruction instances, protocols, structures, and techniques have not been shown in detail in order not to obfuscate the description.

Figure 1:
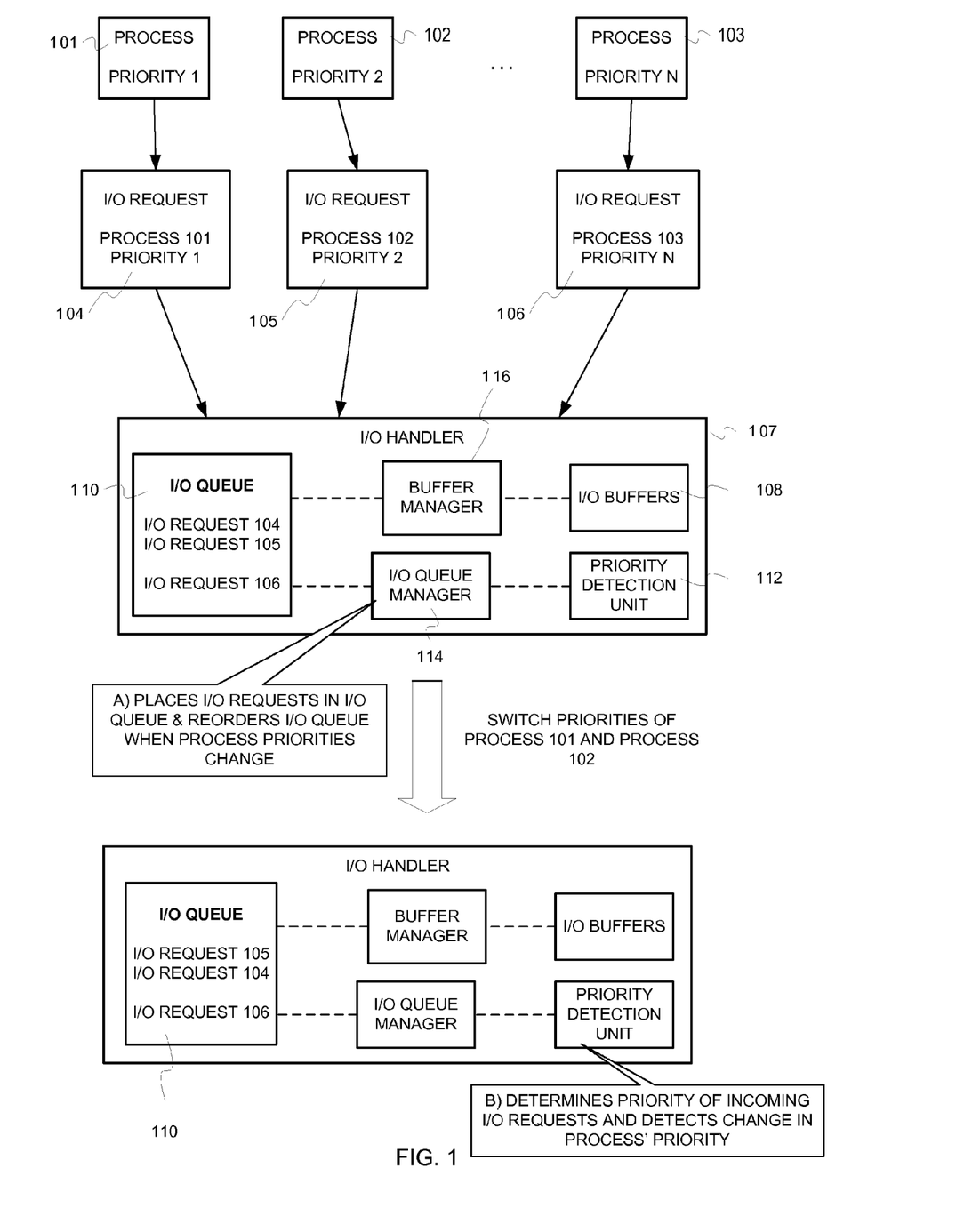
FIG. 1 is an example conceptual diagram illustrating reordering of I/O requests in an I/O queue.
Figure 2:
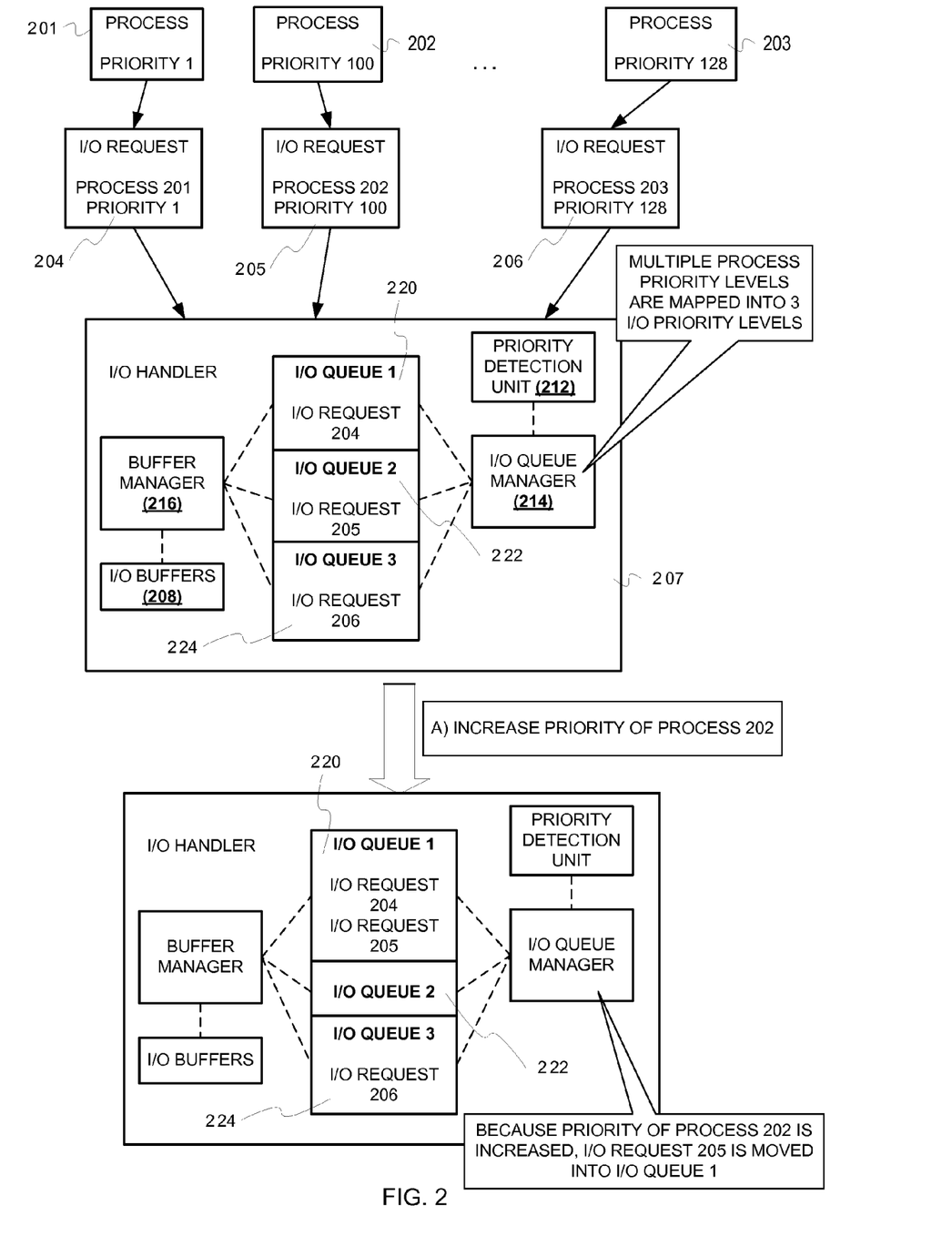
FIG. 2 is an example conceptual diagram illustrating reordering of I/O requests in multiple I/O queues.
Figure 3:
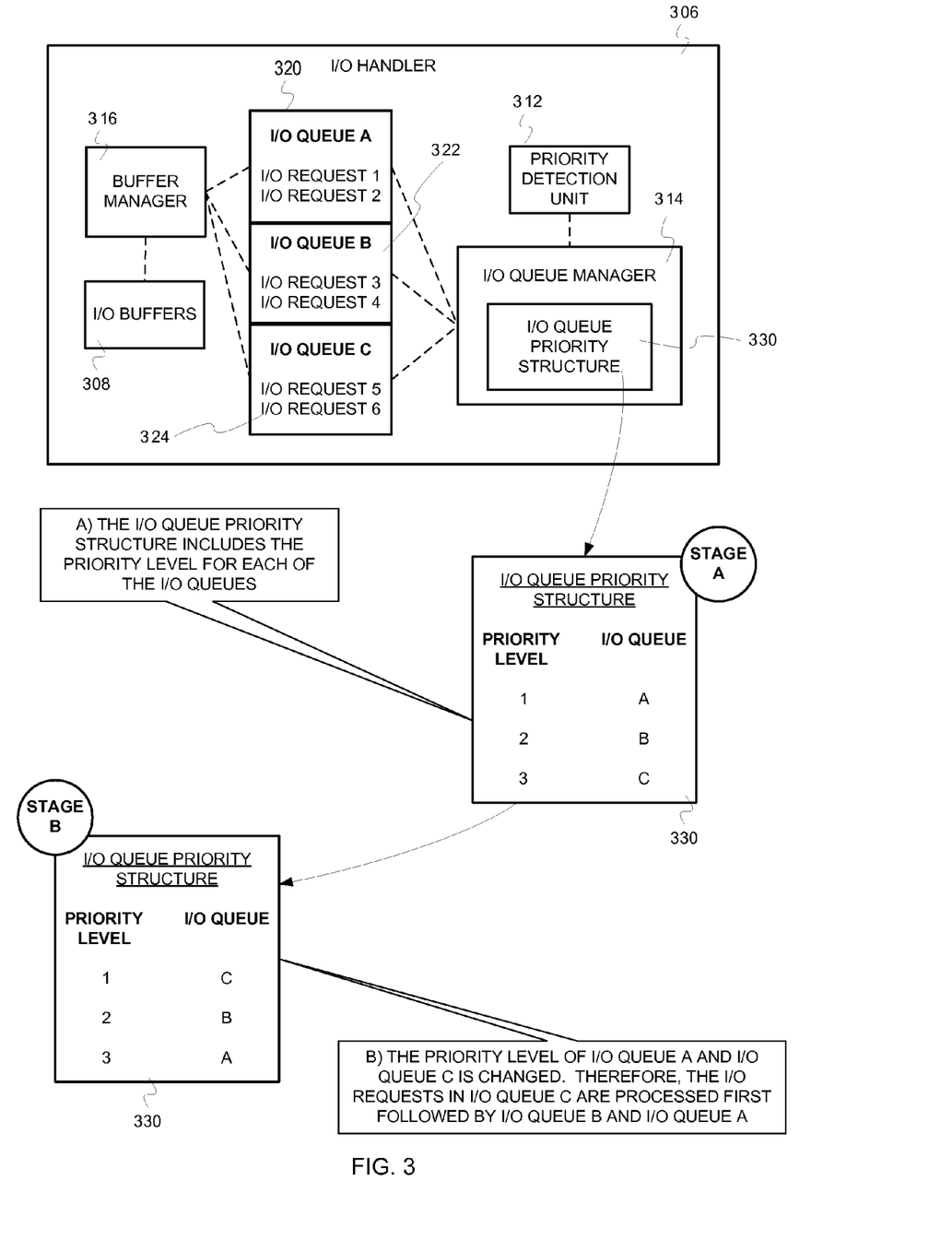
FIG. 3 is an example conceptual diagram illustrating changing priorities of I/O queues.

An application's processes can generate input-output (I/O) requests for read-write operations. I/O requests are generally stored in I/O queues, which are managed by an I/O handler, where the I/O requests wait for I/O buffers to become available and to be processed. The I/O handler can comprise a kernel, a plug-in to an operating system, a process, a function, or other suitable mechanisms configured to control and manage I/O requests. Once the I/O requests are stored in the I/O queues, the I/O requests may no longer be associated with the processes from which they originated. Thus, changing a process' priority may not affect the priority of the I/O request generated by the process. Therefore, after the process' priority has been increased, it may be forced to wait for the I/O handler to service its I/O request, which may be stuck behind an I/O request generated by a lower priority process. Increasing the number of I/O buffers can result in an increase in processing bandwidth, an increase in the number of I/O requests being serviced at any point of time, and a reduction in the I/O request's wait time before it is serviced. However, increasing the number of I/O buffers also increases the amount of memory and resources consumed by the system. To ensure that a high priority process does not have to wait for its I/O requests to be processed, a system can associate the processes' priorities with the I/O requests generated by the processes. The system may also dynamically alter the priorities of the queued I/O requests to reflect changes in the processes' priorities. Reordering the queued I/O requests to reflect changes in the processes' priorities can also ensure that the I/O requests from high priority processes are serviced before the I/O requests from low priority processes. This can ensure efficient processing and lower wait times for high priority processes. FIGS. 1-3 depict conceptual block diagrams and convey some example functionality for associating process priorities with I/O requests. FIGS. 1-3 also describe reordering I/O requests according to changes in process priorities.

FIG. 1 is an example conceptual diagram illustrating reordering of I/O requests in an I/O queue. A computer system can include one or more processes, each of which may have a different priority associated therewith. The system in FIG. 1 includes N processes. An operating system, a system administrator, or a user may assign a different priority level to each of these processes. FIG. 1 depicts the processes 101, 102, and 103, with the priorities as follows: process 101 has a priority of 1 (highest priority level), process 102 has a priority of 2, and process 103 has a priority of N (lowest priority level).

In performing their operations, each of the processes (101, 102, and 103) can generate one or more input-output (I/O) requests. In FIG. 1, process 101 generates I/O request 104, process 102 generates I/O request 105, and process 103 generates I/O request 106. Examples of I/O requests typically include a request to read from memory, a request to write to memory, a request to display data, a request to transmit data, etc. The I/O requests may also include a header or a separate structure comprising information about the process from which it originated. This information can comprise process name, process identification number, process priority, etc. As shown in FIG. 1, I/O request 104 includes information indicating that it was generated by process 101, which has a priority of 1. I/O request 105 includes information indicating that it was generated by process 102, which has a priority of 2. Also, I/O request 106 includes information indicating that it was generated by process 103, which has a priority of N. The I/O requests (104, 105, and 106) are then passed to an I/O handler 107. The I/O handler can 107 comprise a kernel, a plug-in to an operating system, a plug-in to an application, a process, or other suitable mechanisms configured to control and manage I/O requests. I/O requests passed to the I/O handler 107 may include information about parent processes, flags indicating whether the request is a read or write operation, details about the I/O request, etc. In some instances, the process may pass, to the I/O handler 107, a handle indicating process information described earlier.

The I/O handler 107 includes a buffer manager 116 coupled to an I/O queue 110 and I/O buffers 116. The I/O handler 107 also includes an I/O queue manager 114 coupled to a priority detection unit 112 and to the I/O queue 110. The I/O handler 107 detects one or more incoming I/O requests (e.g., 104, 105, and 106). The buffer manager 116 determines whether I/O buffers 108 are available. If the I/O buffers 108 are available, the buffer manager 116 places the incoming I/O requests in the I/O buffers 108 and prompts the I/O handler 107 to service the I/O requests. If the buffer manager 116 determines that all of the I/O buffers 108 are full, the I/O queue manager 114 stores the I/O requests (104, 105, and 106) in the I/O queue 110. The buffer manager 116 can also detect availability of an I/O buffer 108 and move an I/O request with the highest priority into the available buffer. The priority detection unit 112 examines the incoming I/O requests (104, 105, and 106) and determines the priority of the processes from which the I/O requests originated. The priority detection unit 112 communicates the priority, associated with the I/O request, to the I/O queue manager 114. The I/O queue manager 114 then stores the incoming I/O requests according to the priorities of their host processes. As shown in FIG. 1, I/O request 104 is the first request in the I/O queue 110 because its host process (process 101) has the highest priority (i.e., a priority of 1). Likewise, I/O request 106 is the last request in the I/O queue because its host process (process 103) has a priority of N (i.e., the lowest priority). In another embodiment, the I/O queue manager 114 may store the incoming I/O requests, in the I/O queue 110, on a first come first serve basis. In other instances, the user or the system administrator may assign a priority to the incoming I/O requests after the I/O requests have been stored in the I/O queue 110. The priority detection unit 112 may determine the I/O requests' priorities and communicate the determined priorities to the I/O queue manager 114. The I/O queue manager 114 can then reorder the I/O queue according to the determined priorities.

However, after the processes have generated one or more I/O requests and the requests have been stored in the I/O queue, the system administrator may change the priority associated with the processes. For example, the system administrator may use a "renice" command or any suitable command to change the priority of one or more processes. In some instances, the system may include logic (e.g., software, machine instructions, etc.) to automatically modify the priorities of certain processes. For example, the system may determine that process 102 was supposed to finish its operations 12 hours ago, while process 101 has just started its operations. The system may also determine that process 101 has a higher priority as compared to process 102. Therefore, the system may automatically increase the priority of process 102 and decrease the priority of process 101. To ensure that process 102's operations are not delayed, the system can increase the priority of the I/O request generated by process 102 (i.e., I/O request 105). The system examines the modified I/O request (105) and the I/O queue (110) to determine if and where to move the I/O request 105. In some embodiments, moving an I/O request higher up in the I/O queue may indicate an increase in an I/O request's priority.

In FIG. 1, the priorities of process 101 and process 102 are switched. Accordingly, the order of I/O request 104 and I/O request 105 are switched in I/O queue 110 to reflect the change in the processes' priorities. The priority detection unit 112 detects a change in the processes' priority. In some instances, the priority detection unit 112 may receive a notification from the processes indicating a change in priority information. In other instances, the I/O handler 107 may use a dedicated thread to continually track the processes, check the processes' priorities, and detect a change in the processes' priorities. The priority detection unit 112 communicates the change in the processes' priorities to the I/O queue manager 114. The I/O queue manager 114 determines the I/O requests generated by the modified processes and reorders the I/O requests in the I/O queue 110. In some instances, the I/O queue manager 114 may include an I/O request priority structure (not shown). The I/O queue manager 114 may modify the I/O request priority structure to indicate a change in the I/O requests' priority without reordering the I/O queue.

FIG. 2 is an example conceptual diagram illustrating the reordering of I/O requests in multiple I/O queues. The system of FIG. 2 includes N processes, each process at a different priority level. FIG. 2 depicts the processes 201, 202, and 203, with the priorities as follows: process 201 has a priority of 1 (highest priority), process 202 has a priority of 100, and process 203 has a priority of 128 (lowest priority). Each of the processes (201, 202, and 203) can generate one or more I/O requests. The I/O requests are associated with their parent process' priority level. In FIG. 1, process 201 generates I/O request 204, process 202 generates I/O request 205, and process 203 generates I/O request 206. Also, I/O request 204 is associated with priority level 1, I/O request 205 is associated with priority level 100, and I/O request 206 is associated with priority level 128. The I/O requests (204, 205, and 206) are passed, along with originating process information (e.g., parent process name, parent process priority level, etc.), to an I/O handler 207.

The I/O handler 207 includes a buffer manager 216 coupled with I/O buffers 208 and three I/O queues (i.e., I/O queue 1 (220), I/O queue 2 (222), and I/O queue 3 (224)). The I/O handler 207 also includes an I/O queue manager 214 coupled to a priority detection unit 212 and the three I/O queues (220, 222, and 224). In some embodiments, the I/O handler 207 can include less than or more than three queues.

The I/O handler 207 detects incoming I/O requests and interfaces with the buffer manager 216 to determine whether I/O buffers 208 are available. If all of the I/O buffers 208 are full, the I/O requests can be stored in any one of the I/O queues (220, 222, or 224). The priority detection unit 212 determines the priorities associated with one or more incoming I/O requests. In FIG. 2, the priority detection unit 212 determines, based on the priority information, that I/O request 205 has a priority of 100. The priority detection unit 212 interfaces with the I/O queue manager 214 to communicate the determined priority of the I/O request 205. With the determined priority of the I/O request 205, the I/O queue manager 214 stores the I/O request 205 in the appropriate one of the I/O queues 220, 222, and 224. Typically, the number of I/O queues is less than or equal to the number of process priority levels. Therefore, the I/O queue manager 214 may include logic to map priority of a process to an I/O priority. In FIG. 2, the I/O queue manager 214 stores the I/O request 204 in I/O queue 1 (220), the I/O request 205 in I/O queue 2 (222), and the I/O request 206 in I/O queue 1 (224).

In stage A, the priority of process 202 is increased (e.g., by an administrator or a user using a "renice" command). The priority detection unit 212 detects a change in the priority of process 202 and communicates this change to the I/O queue manager 214. The I/O queue manager 214 determines that the I/O request 205 was generated by the process 202. The I/O queue manager 214 also determines that the modified priority level of process 202 (and hence the modified priority level of the I/O request 205) maps to I/O queue 1 (220). As shown in FIG. 2, the I/O queue manager moves the I/O request 205 from the I/O queue 2 (222) to the I/O queue 1 (220). In some instances, the I/O queue manager may store I/O requests from a collection of related processes (e.g., a process group) in an I/O queue. Thus, the I/O queue manager 214 may detect a modification in a process' priority and determine one or more I/O requests generated by the modified process. The I/O queue manager may also determine a process group to which the modified process belongs and the I/O queue associated with the process group. The I/O queue manager can then reorder the determined I/O queue to reflect the modified I/O requests. Thus, a change in a process' priorities (and hence in I/O request priorities) may lead to a reordering of I/O requests within the I/O queue assigned to the process' process group.

A system can also implement functionality to change the priority of an entire I/O queue in addition to or instead of changing the priority of individual I/O requests within an I/O queue. FIG. 2 illustrates the scenario where the priority of one or more I/O requests is modified (because of a modification in the process' priority), and the I/O requests are moved between multiple queues. However, in some instances, the system administrator may want to increase the priority of the entire I/O queue as opposed to moving I/O requests between the I/O queues. For example, a server may have two sets of I/O requests—one to be serviced in the morning and the other to be serviced in the afternoon. In the afternoon, the system administrator may determine that the I/O requests, which were to be completed in the morning, are still pending. The system administrator may also determine that the afternoon I/O requests have a higher priority as compared to the morning I/O requests. The system administrator can place the morning I/O requests in a separate I/O queue and increase the priority of the I/O queue. This may ensure that the morning I/O requests are processed before the afternoon I/O requests. As another example, administrators may run backup jobs, requiring a lot of processing and memory, at the end of the year. The backup jobs are typically run at times when the load on the system is low (e.g., at night). However, the jobs may still be running in the morning, when users log on to the system and try to access its resources. In some instances, user requests may get intermeshed with the backup jobs. The administrator may find it advantageous to store all the backup jobs in an I/O queue and assign, to this I/O queue, the highest priority. This may ensure that old jobs (i.e., backup jobs) are completed before new jobs (i.e., user requests) are started.

FIG. 3 is an example conceptual diagram illustrating changing priorities of I/O queues. FIG. 3 illustrates an I/O handler 306 comprising a buffer manager 316 coupled with I/O buffers 308 and three I/O queues (i.e., I/O queue A (320), I/O queue B (322), and I/O queue C (324)). The I/O handler 306 also includes an I/O queue manager 314 coupled to a priority detection unit 312 and the three I/O queues (320, 322, and 324). The I/O queue manager 314 comprises an I/O queue priority structure 330. The I/O queues 320, 322, 324 host I/O requests as follows: I/O queue A (320) hosts I/O requests 1 and 2; I/O queue B (322) hosts I/O requests 3 and 4; and I/O queue 3 (324) hosts I/O requests 5 and 6. Although FIG. 3 depicts three I/O queues, each queue containing two I/O requests, the I/O handler 306 can comprise any suitable number of I/O queues, each queue with the same or different capacity.

The I/O handler 306 receives I/O requests generated by one or more processes (not shown). The priority detection unit 312 determines the priorities of the processes that generated the I/O requests. The I/O queue manager 314 determines and stores the I/O requests in the appropriate I/O queue. The I/O queue manager 314 also stores the priority information (e.g., parent process name, parent process priority level, etc.) associated with each of the I/O requests. In some instances, this priority information may be stored as a part of the individual I/O requests, while in other instances, the priority information may be stored in the I/O queue priority structure 330. The I/O queue manager 314 also stores, in the I/O queue priority structure 330, priorities associated with each of the I/O queues. When one of I/O buffers 308 becomes available, the buffer manager 316 can access the I/O queue priority structure 330 and determine the I/O queue with the highest priority level. The buffer manager 316 can also determine the I/O request, within the I/O queue, with the highest priority and move the I/O request to an available I/O buffer 308 to be serviced. Stage A in FIG. 3 illustrates an example I/O queue priority structure 330 wherein I/O queue A (320) has a priority of 1, I/O queue B (322) has a priority of 2, and I/O queue C (324) has a priority of 3. In FIG. 3, I/O queue A (320) has the highest priority, while I/O queue C (324) has the lowest priority. In other words, the I/O handler 306 will first service the I/O requests in I/O queue A (320), followed by the I/O requests in I/O queues B (322) and C (324).

As described earlier, in some instances, the system administrator may want to change the priority of all the I/O requests in an I/O queue. Instead of moving the I/O requests in a particular queue to a higher (or lower) priority I/O queue, the administrator may increase (or decrease) the priority of the I/O queue. However, the priority of the I/O queue may not be changed unless all the I/O requests in the I/O queue require the same priority modification. In stage B, the administrator modifies the I/O queue priority structure 330 to indicate a change in the I/O queue priority. As shown, in stage B, I/O queue C (324) now has a priority of 1 (highest priority level), while I/O queue A has a priority of 3 (lowest priority level). Therefore, the I/O handler 306 will first service the I/O requests in I/O queue C (324), followed by the requests in I/O queues B (322) and A (320). Additionally, the system administrator may also change the priorities of individual I/O requests within the I/O queue (as described in FIG. 1 and FIG. 2). Thus, changing an I/O queue's priority affects the priority of the I/O requests contained within the I/O queue.

The conceptual block diagrams depicted in FIGS. 1-3 should not be used to limit embodiments as the functionality described with reference to FIGS. 1-3 may be performed by blocks not shown in the figures. For example, although the I/O queue manager and the priority detection unit are depicted as separate structures, some embodiments may include a single structure combining the functionality of both units. In some embodiments, the I/O queue manager may include a structure indicating I/O queue priorities and I/O request priorities, while in other embodiments, this structure may be stored separate from the I/O queue manager. Also, in some instances, priority information associated with the I/O queues and the I/O requests may be stored as part of the I/O queues and the I/O requests respectively. In some instances, a system with a multi-queue architecture may be used as a single queue system (e.g., by activating only a single queue). An I/O request's current priority may be stored in a structure (e.g., the I/O queue priority structure) so that the I/O request is associated with its parent process' priority information even after the parent process is terminated (before the I/O request is serviced).

Figure 4:
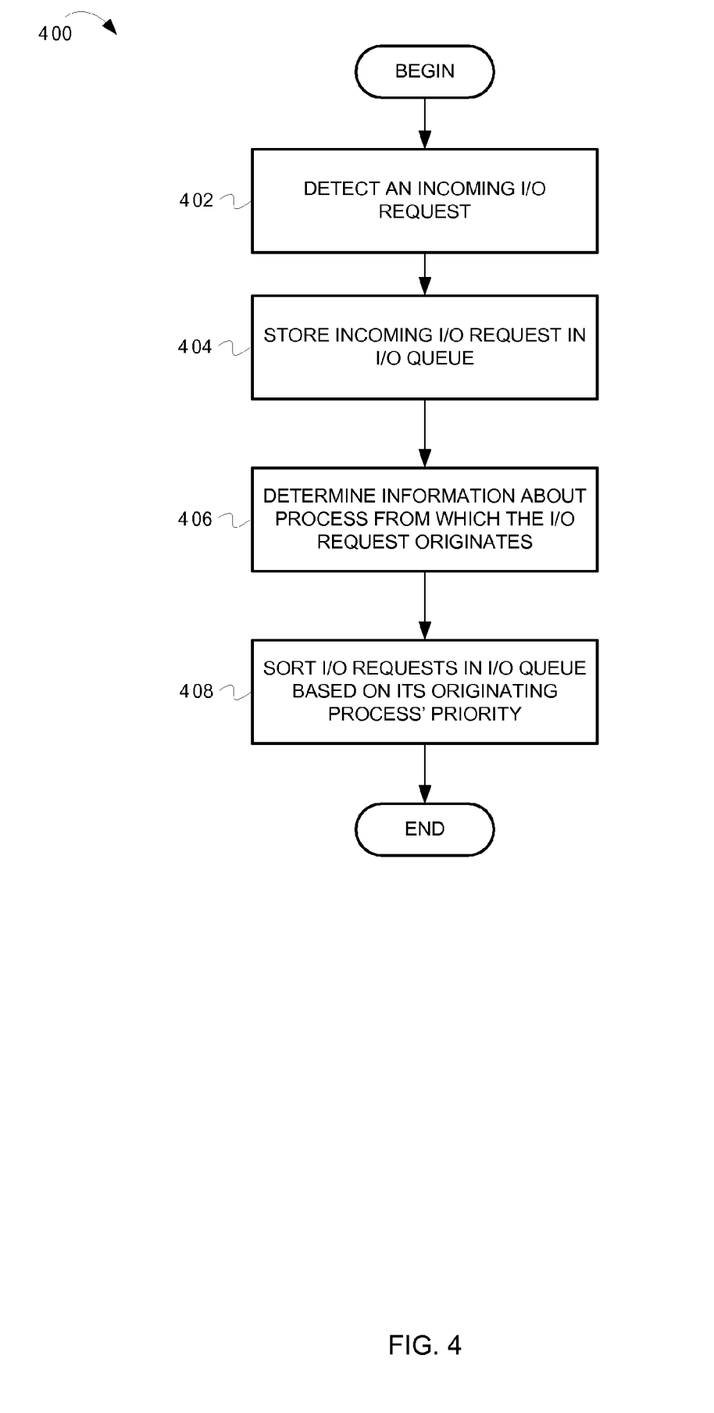
FIG. 4 is a flow diagram illustrating example operations for sorting I/O requests in an I/O queue.

FIG. 4 is a flow diagram illustrating example operations for sorting I/O requests in an I/O queue. The flow 400 begins at block 402.

At block 402, an incoming input-output (I/O) request is detected. The I/O request may be generated in response to a read command, a write command, a display command, etc. issued by a user, an application's process, a thread, etc. The flow continues at block 404.

At block 404, the incoming I/O request is stored in an I/O queue. Typically, the I/O request is stored in the I/O queue (managed by an operating system's kernel or suitable mechanism configured to control and manage I/O requests) when there are not enough buffers to process the incoming I/O request. In some instances, I/O requests may be stored in the I/O queue on a first come first serve basis, where every request in the I/O queue has the same initial priority. In other instances, the I/O requests originating from a particular process may be grouped and stored together. In some instances, the I/O requests may be stored based on a user-defined priority level. The flow continues at block 406.

At block 406, information about the process, from which the I/O request originated, is determined. Information about the process can include process name, process identification number, process priority level, name and location of parent application, a pointer to the process, etc. In some instances, the information can be stored as part of the I/O request (e.g., in the I/O request header, in the body of the I/O request, etc.). In other instances, the information about the process may be stored in a separate structure in memory and the I/O request may include a reference to this information. The flow continues at block 408.

At block 408, the I/O requests in the I/O queue are sorted. In some instances, the I/O requests can be sorted based on the priority of the processes (determined at block 406) that generated the I/O requests. For example, I/O requests generated by a process with a higher priority may be placed, in the I/O queue, before I/O requests from a process with a lower priority. This may ensure that I/O requests from high priority processes are serviced before I/O requests from lower priority processes. From block 408, the flow ends.

Figure 5:
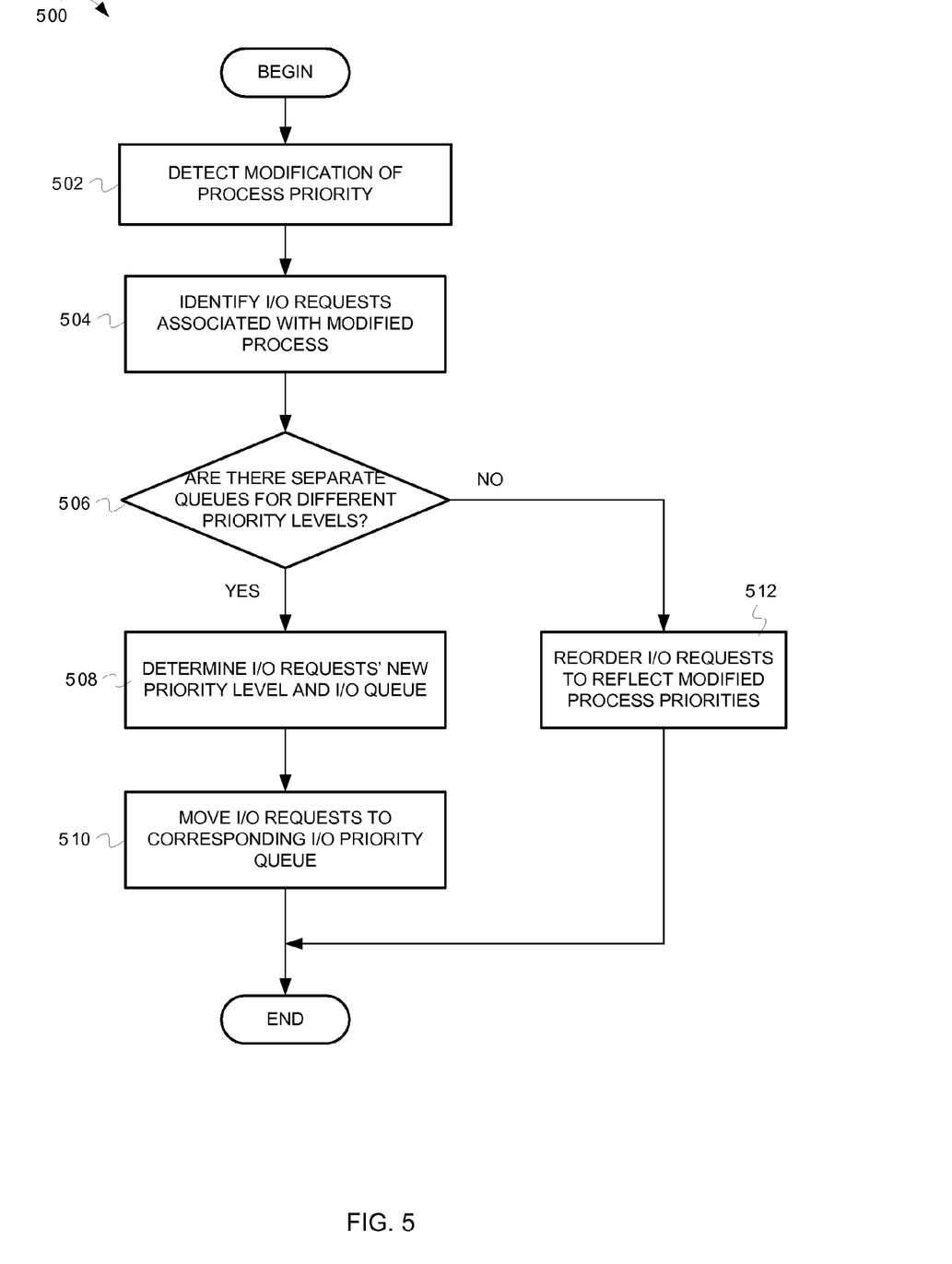
FIG. 5 is a flow diagram illustrating example operations for reordering queued I/O requests based on modified process priorities.

FIG. 5 is a flow diagram illustrating example operations for reordering queued I/O requests based on modified process priorities. The flow 500 begins at block 502.

At block 502, a modification of a process' priority is detected. In some instances, the modified process may include logic (e.g., software, machine instructions, etc.) to communicate the change in priority. In other instances, the system may perform regular checks and request priority information from each of the running processes. In other instances, the system may dedicate a thread or a daemon to detect and report a change in the processes' priority (e.g., determining a change in the processes' "nice" value). The flow continues at block 504.

At block 504, one or more queued I/O requests, associated with the modified process are identified. The I/O requests are typically associated with information identifying the processes from which they originated. Therefore, it may be possible to determine the I/O requests generated by the modified process. If the process' priority is changed, the priorities of other processes, I/O requests, etc. on which the modified process is dependent may have to be changed. This can reduce the possibility of a high priority process having to wait because its I/O request is waiting to be processed behind a lower priority I/O request. The flow continues at block 506.

At block 506, it is determined whether there exist separate queues for different priority levels. In some instances, a system may include logic (e.g., software, machine instructions, hardwired logic, etc.) to operate in either a single-queue or a multi-queue mode, allowing for easy transition in case the system architecture is changed. In some embodiments, systems may operate solely as single queue systems where the flow 500 can be represented as blocks 502, 504, and 512. In other embodiments, systems may operate only as multi-queue systems where the flow 500 can be represented as blocks 502, 504, 508, and 510. If it is determined that there exists a single queue for all I/O requests, the flow continues at block 512. Otherwise, the flow continues at block 508.

At block 512, the I/O requests in the I/O queue are reordered to reflect the modified process priorities. Any suitable sorting algorithm (e.g., bubble sorting algorithm, binary tree sorting algorithm, etc.) can be implemented to reorder the I/O requests on the basis of their host process' priorities. From block 512, the flow ends.

At block 508, the I/O requests' new priority level and new I/O queue are determined. As described earlier, the number of I/O queues is typically less than the number of priority levels. For example, there may be 128 process priority levels but only four I/O priority levels (represented as four I/O queues). The I/O requests may be mapped into four I/O queues such that I/O requests with associated parent process priorities 1-32 are mapped into I/O queue 1, I/O requests with associated parent process priorities 33-64 are mapped into I/O queue 2, and so on. In that example, if an I/O request's associated process priority is modified from 70 to 5, the I/O request is moved from I/O queue 3 to I/O queue 1. The flow continues at block 510.

At block 510, the I/O requests are moved to the appropriate I/O queue (determined at block 508) to reflect the modified process priorities. From block 510, the flow ends.

The previous Figures describe operations for modifying queued I/O requests' priorities according to modifications in the processes priorities. However, in some instances, changing an I/O request's priority may trigger a change in the priority of the process that generated the I/O request. In other instances, it may be possible to modify a process' priority without affecting the priorities of the I/O requests generated by the process. In other instances, it may be possible to modify an I/O request's priority without modifying the priority of the process that generated the request. For example, a process may perform many functions, but only a specific function may need speeding up. It may be possible to change the priority of the I/O requests associated with the specific function, without having to change the process' priority. The example embodiments described above can be performed by user commands (e.g., machine instructions, functions, etc.) operating on one or more of the I/O queues. For example, a command can be designed to determine the I/O request's priority, determine the process associated with the I/O request, and change the I/O request's priority without modifying the process' priority.

Figure 6:
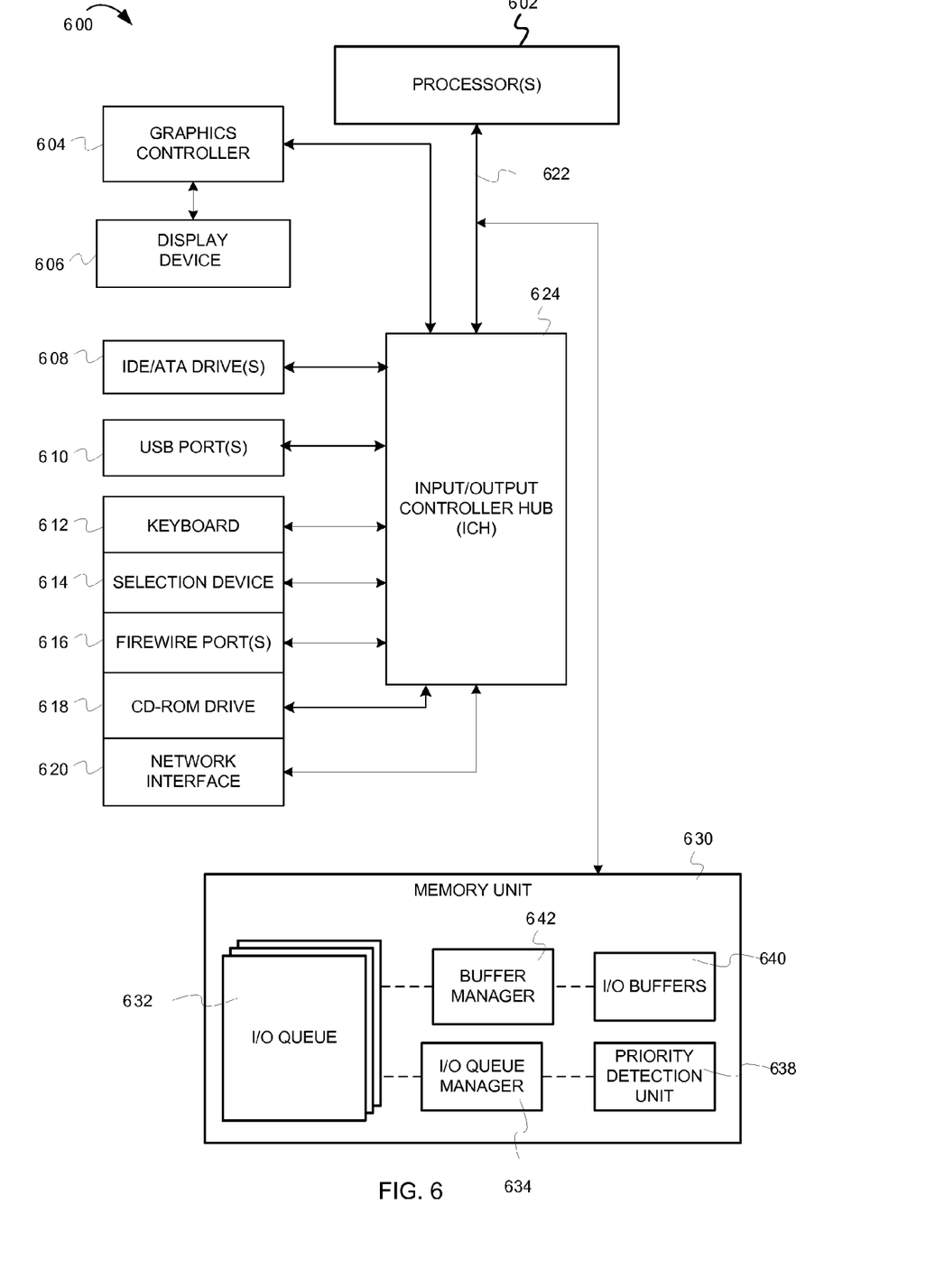
FIG. 6 is an example computer system configured to sort and reorder queued I/O requests.

FIG. 6 is an example computer system configured to sort and reorder queued I/O requests. The computer system 600 includes a processor 602. The processor 602 is connected to an input/output controller hub 624 (ICH), also known as a south bridge, via a bus 622 (e.g., PCI, ISA, PCI-Express, HyperTransport, etc). A memory unit 630 interfaces with the processor 602 and the ICH 624. The main memory unit 630 can include any suitable random access memory (RAM), such as static RAM, dynamic RAM, synchronous dynamic RAM, extended data output RAM, etc.

In one embodiment, the memory unit 630 embodies functionality to propagate process priorities to I/O queues and dynamically order the I/O requests based on those priorities. The memory unit 630 includes a buffer manager 642 coupled with I/O buffers 640 and one or more I/O queues 632. The memory unit 630 also includes an I/O manager 634 coupled to a priority detection unit 638 and the one or more I/O queues 632. The priority detection unit 638 determines the priority of incoming I/O requests and detects a modification in the priority of a process or an I/O request. The I/O queue manager 634 determines an appropriate I/O queue (in a multi-queue system) and stores I/O requests in the I/O queue. The I/O queue may be configured as a software or a hardware queue. The I/O queue manager 634 can also reorder the I/O requests according to modifications in the I/O requests' host process priorities. The buffer manager 642 can determine the I/O request with the highest priority and move the I/O request to an available I/O buffer 640 for further processing.

The ICH 624 connects and controls peripheral devices. In FIG. 6, the ICH 624 is connected to IDE/ATA drives 608 (used to connect external storage devices) and to universal serial bus (USB) ports 610. The ICH 624 may also be connected to a keyboard 612, a selection device 614, firewire ports 616 (for use with video equipment), CD-ROM drive 618, and a network interface 620. The ICH 624 can also be connected to a graphics controller 604. The graphics controller is connected to a display device (e.g., monitor). In some embodiments, the computer system 600 can include additional devices and/or more than one of each component shown in FIG. 6 (e.g., video cards, audio cards, peripheral devices, etc.). For example, in some instances, the computer system 600 may include multiple processors, multiple cores, multiple external CPU's. In other instances, components may be integrated or subdivided.

Embodiments may take the form of an entirely hardware embodiment, a software embodiment (including firmware, resident software, micro-code, etc.) or an embodiment combining software and hardware aspects that may all generally be referred to herein as a "circuit," "module" or "system". Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in a machine-readable signal medium that can include an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

While the embodiments are described with reference to various implementations and exploitations, it will be understood that these embodiments are illustrative and that the scope of the inventive subject matter is not limited to them. In general, techniques for associating process priority with I/O queuing are described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining that a priority of a first of a plurality of processes changes from a first priority to a second priority;
    determining that a first of a plurality of input/output requests originated from the first process, wherein the first input/output request is stored in a first of a plurality of input/output (I/O) queues; and
    moving the first input/output request from the first I/O queue that corresponds to the first priority to a second I/O queue that corresponds to the second priority based, at least in part, on said determining that the priority of the first process changed from the first priority to the second priority.

2. One or more machine-readable storage media having stored therein a program product for dynamic reordering of I/O requests, which when executed by a set of one or more processor units causes the set of one or more processor units to perform operations that comprise:
    determining that a priority of a process changes from a first priority value to a second priority value;
    determining that a first of a plurality of input/output (I/O) requests originated from the process, wherein the first I/O request is stored in a first of a plurality of I/O queues; and
    moving the first I/O request from the first I/O queue that corresponds to the first priority value to a second of the plurality of I/O queues that corresponds to the second priority value based, at least in part, on said determining that the priority of the first process changed from the first priority value to the second priority value.

* * * * *